United States Patent
Forstmeier

(10) Patent No.: US 10,873,171 B2
(45) Date of Patent: Dec. 22, 2020

(54) METHOD FOR THE INTEGRALLY BONDED JOINING OF AN ELECTRIC CABLE TO AN ELECTRICAL CONTACT PART AND ELECTRIC CABLE ARRANGEMENT

(71) Applicant: Lisa Dräxlmaier GmbH, Vilsbiburg (DE)

(72) Inventor: Christoph Forstmeier, Landshut (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 0 days.

(21) Appl. No.: 16/758,105

(22) PCT Filed: Oct. 8, 2018

(86) PCT No.: PCT/EP2018/077314
§ 371 (c)(1),
(2) Date: Apr. 22, 2020

(87) PCT Pub. No.: WO2019/081193
PCT Pub. Date: May 2, 2019

(65) Prior Publication Data
US 2020/0280156 A1    Sep. 3, 2020

(30) Foreign Application Priority Data
Oct. 23, 2017  (DE) .................. 10 2017 124 693

(51) Int. Cl.
*H01R 43/02* (2006.01)
*B23K 20/12* (2006.01)
*H01R 4/02* (2006.01)

(52) U.S. Cl.
CPC ....... *H01R 43/0235* (2013.01); *B23K 20/129* (2013.01); *H01R 4/023* (2013.01)

(58) Field of Classification Search
CPC .......................... H01R 43/0235; H01R 4/023
(Continued)

(56) References Cited

U.S. PATENT DOCUMENTS

| 2,641,670 A * | 6/1953 | Grave, Jr. | ............ | H01H 1/0233 |
| | | | | 200/264 |
| 2,652,624 A * | 9/1953 | Guinee | ................ | H01H 1/0231 |
| | | | | 419/6 |

(Continued)

FOREIGN PATENT DOCUMENTS

DE        10346160 B3      7/2005
DE   102008059481 A1      6/2010
(Continued)

OTHER PUBLICATIONS

Thomson Reuters, Adjustable metal powder metering device for use in automatic deposition welding, Dervent, DD 216879, Abstract (Year: 1985).*

(Continued)

*Primary Examiner* — Alexander Gilman
(74) *Attorney, Agent, or Firm* — Jacob Eisenberg

(57) ABSTRACT

The present disclosure relates to a process for integrally joining an electrical line to an electric contact part by means of a material bond. An exposed end of the line is inserted into a receiving sleeve of the contact part. Then a friction welding tool is rotated on an open end face of the receiving sleeve for the cohesive connection of the line end with the receiving sleeve. According to the disclosure, a powdery metal filler material is introduced into the receiving sleeve before rotation in such a way that the metal filler material is at least partially arranged between the line end and/or the receiving sleeve and the friction welding tool. Furthermore, the disclosure also concerns an electrical line arrangement which is manufactured with the aid of the metal filler material.

15 Claims, 3 Drawing Sheets

(58) Field of Classification Search
USPC .......................................................... 439/874
See application file for complete search history.

(56) References Cited

U.S. PATENT DOCUMENTS

| | | | | | |
|---|---|---|---|---|---|
| 3,978,248 | A | * | 8/1976 | Usami | C04B 35/111 |
| | | | | | 438/106 |
| 4,469,395 | A | * | 9/1984 | Bennett | H01R 4/029 |
| | | | | | 439/894 |
| 5,718,047 | A | * | 2/1998 | Nakayama | H01R 43/20 |
| | | | | | 29/739 |
| 8,448,836 | B2 | * | 5/2013 | Schloms | B23K 20/10 |
| | | | | | 228/110.1 |
| 2002/0005247 | A1 | * | 1/2002 | Graham | C09J 9/02 |
| | | | | | 156/291 |
| 2007/0240897 | A1 | * | 10/2007 | Gafri | H01R 4/625 |
| | | | | | 174/94 R |
| 2013/0035732 | A1 | * | 2/2013 | Miltich | H01R 43/0221 |
| | | | | | 607/2 |
| 2014/0218147 | A1 | * | 8/2014 | Chatani | H01F 1/14775 |
| | | | | | 336/20 |
| 2015/0244159 | A1 | * | 8/2015 | Seifert | H01R 4/72 |
| | | | | | 174/77 R |
| 2015/0364838 | A1 | * | 12/2015 | Tonoike | H01R 4/183 |
| | | | | | 439/879 |
| 2016/0006138 | A1 | * | 1/2016 | Harms | B23K 11/0026 |
| | | | | | 174/74 A |
| 2016/0099510 | A1 | * | 4/2016 | Trafton | H01B 7/0036 |
| | | | | | 174/74 R |
| 2017/0346197 | A1 | * | 11/2017 | Nabeta | B23K 20/10 |
| 2019/0165535 | A1 | * | 5/2019 | Sato | H01R 43/058 |
| 2020/0153124 | A1 | * | 5/2020 | Scharkowski | H01R 11/12 |

FOREIGN PATENT DOCUMENTS

| | | |
|---|---|---|
| DE | 102011017070 A1 | 10/2012 |
| DE | 102013101876 B3 | 6/2014 |
| JP | H08138822 A | 5/1996 |
| JP | 2004050204 A | 2/2004 |
| WO | WO20121063961 A1 | 5/2012 |

OTHER PUBLICATIONS

DE10346160B3 English language Abstract.
DE102008059481A1 English language US2011048763A1.
DE102011017070A1 English language US2013059473A1.
DE102013101876B3 English language US10516220B2.
JP2004050204A English language Abstract.
JPH08138822A English language Abstract.

* cited by examiner

METHOD FOR THE INTEGRALLY BONDED JOINING OF AN ELECTRIC CABLE TO AN ELECTRICAL CONTACT PART AND ELECTRIC CABLE ARRANGEMENT

CROSS REFERENCE TO RELATED APPLICATIONS

This application is a national phase application of International Application No. PCT/EP2018/077314, filed on Oct. 8, 2018, and claims the priority benefit of German Application 102017124693.2, filed on Oct. 23, 2017, the content of both of which is incorporated herein by reference.

TECHNICAL FIELD

The present disclosure relates to a process for integral joining an electric cable to an electric contact part in accordance with the terms of claim 1.

BACKGROUND

A procedure according to the generic term of claim 1 is known from DE 10 2013 101 876 B3. A friction welding process is used here, in particular to integrally join stranded conductors made of aluminum with an electrical contact part. In the case of a stranded conductor, a bundle of individual stands is inserted via an inlet opening into a receiving sleeve of the contact part. Then, to produce a materially joined connection between at least a partial number of the individual strands and the inner wall of the receiving sleeve, welding energy from a welding process is fed in by means of a welding mandrel.

Although good welding results can be achieved with this method, it has been shown in practice that e.g. in case of a pipe made of aluminum oxide layers may remain on the material to be welded. These can influence the welding quality or the long-term behavior of the joint.

SUMMARY

The task of the disclosure is therefore to create a possibility, using means that are as simple as possible in terms of design, to reliably break open the oxide layers of an electrical line during the integral joining of the material to an electrical contact part.

Objects and advantages of the disclosed embodiments may be realized and attained by the elements and combinations set forth in the claims. However, embodiments of the present disclosure are of necessarily required to achieve such, exemplary objects and advantages, and some embodiments may not achieve any of the stated objects and advantages.

A method according to the disclosure for integral joining an electrical line to an electrical contact part by material bonding comprises the following steps:

Inserting an exposed line end of the line into a receiving sleeve of the contact part. If the line has an insulation jacket, this is removed to expose a conductor of the line. The receiving sleeve can be open on/at its two opposite end faces so that the line can be inserted from one end face. The receiving sleeve and the line are also generally referred to as the joining partner in the following.

Rotating of a friction welding tool on or possibly also in sections within an open-end face of the receiving sleeve for integrally connecting the line end to the receiving sleeve. This open-end face may be the one opposite to the one from which the line is inserted. The friction welding tool can e.g. have a shoulder and a pin protruding therefrom, as used in particular for friction stir welding. The rotation causes a friction between the joining partners and the friction welding tool and leads to the melting point of the materials of the joining partners for their plasticization and thus to a material bond between them.

Introducing a powdered metal filler material into the receiving sleeve before or, if necessary, also while rotating, in such a way that the metal filler material is at least partially arranged between the line end and/or the receiving sleeve and the friction welding tool. This means that in addition to the metal materials of the joining partners, a further metal material is introduced. The metal filler material is available in powder form in particles, for example, that can also be distributed around the line end. In principle, it would be conceivable that the metal filler material is the same material as the joining partners. However, a different material is preferred.

The method according to the disclosure thus offers several advantages. In contact with the joining partners, the metal filler material can break up the oxide layers present there and thus improve the weldability or increase welding quality. The oxide layers can be broken up, for example, by friction between the particles of the metal additive and the joining partners. In addition, the powdered metal additive can also reduce the friction or increase the frictional resistance of the friction welding tool relative to the joining partners, which can accelerate the plasticizing of the joining partners. In addition, the metal filler material can form a welding surface that protects in particular against environmental influences such as corrosion.

Depending on the joining partners to be connected, different amounts of the metal additive material can be advantageous. Accordingly, a further development of the disclosure provides that the metal filler material is introduced into the receiving sleeve by means of an adjustable metering device before the friction welding tool rotates.

In order to better distribute the metal additive, in particular its particles, between the conductor and the receiving sleeve, the metal additive can be distributed within the receiving sleeve by means of ultrasound. For this purpose, ultrasonic vibrations can be generated with an ultrasonic device, which at least vibrates the receiving sleeve e.g. so that the particles are moved to the desired position.

The breaking up of the oxide layers and the increase in friction between them, the friction welding tool, and the joining partners can be further improved if the metal filler material is selected with a grain size and/or a grain shape that increases friction with the friction welding tool. The following grain sizes have proven to be particularly suitable: 0.1 to 250 µm, in particular 30 to 45 and 75 to 250 µm. The grain shape can be selected from: spattered, spherical (ball form), flaky (flaked form) and amorphous.

In order to match the metal filler material to the joining partners, the metal filler material can be a mixture of different grain sizes and/or grain shapes. The mixture can also be inhomogeneous in the manner of a mixture. Accordingly, several parts of individual grain sizes or grain forms can be mixed together.

It has proven to be particularly advantageous if the metal filler material is selected or mixed from the following materials: brass, bronze, silver or nickel and their alloys.

In order to be able to provide various connecting parts, such as a cable lug, a plug contact or the like, the contact part can be formed/designed in two parts with the receiving sleeve and a connecting part for connection to an electrical counter-connection. The two parts of the contact part can then be joined together in advance e.g. by clinching, flanging, folding or similar methods.

In order to achieve an even better connection between the contact part and the connecting part, especially in the case of a two-part contact part, an additional solder material can be used to join the contact sleeve to the connecting part. In addition to a mechanical connection, a cohesive connection can also be achieved. The solder material can be supplied from the outside. The thermal energy required to melt the solder material can easily be generated during friction welding, as this results in heat input in the area of the solder material anyway, so that no further process step is necessary here.

In a particularly advantageous development of the disclosure, the solder material can also already be integrated in the contact part. In particular, the receiving sleeve and/or the connecting part can have a solder material depot, which is arranged in such a way that, due to the rotation of the friction welding tool, the solder material is released for joining the receiving sleeve and the connecting part by heat input and/or by residual heat resulting therefrom. This means that the solder material does not have to be supplied from the outside but is already arranged in the area provided for it. For a particularly good mechanical and in particular electrical connection, the receiving sleeve and the connecting part can be pressed together before the cable end is introduced. One part can be inserted into the other and the outer part can then be pressed from a lateral or radial direction.

It is also conceivable that, prior to rotation, an additional, preferably powdery, solder material is introduced into the receiving sleeve in such a way that the solder material is arranged in a heat input zone for melting. The solder material can therefore also be in powder form like the metal filler material and can then be introduced into the receiving sleeve in a similar way to the metal filler material. Here, the solder material primarily serves to improve the integrally joining of the line with the receiving sleeve and is not limited to the variant with the two-part contact part.

The cohesive connection between the line and the receiving sleeve can be formed even better if the contact part has a solder material depot in a heat input zone, from which the solder material is melted due to the rotation of the friction welding tool by heat input and/or by a resulting residual heat. The cohesive connection using the metal filler material is thus further improved by an additional solder material.

The disclosure can be used to particular advantage if the line has a conductor made of an aluminum material. Due to its creep and setting behavior, aluminum is difficult to connect mechanically because such connections can loosen over time. A permanent connection is created by an integral connection.

The disclosure can be used even more advantageously if the line is designed as a stranded conductor and the metal filler material is distributed between the strands. In particular, the particles of the powdery metal filler material can be brought between the strands and melted there as a result of the friction welding.

The method according to the disclosure offers advantages, in particular for material combinations, which have unfavorable positions to each other in the electrochemical voltage series. Accordingly, the disclosure offers advantages if the contact part is made of a copper material at least in the area of the receiving sleeve.

The disclosure also relates to an electrical line arrangement comprising at least one electrical line and at least one electrical contact part, which are integrally joined by the process described above. This line arrangement can be manufactured at low cost and offers excellent long-term properties, especially when combing different materials.

BRIEF DESCRIPTION OF THE FIGURES

Further advantages, features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure.

An advantageous design example of the disclosure is explained below with reference to the accompanying figures, wherein.

The figures are merely schematic, exemplary representations and serve only to explain the disclosure. Elements which are identical or have the same effect are consistently marked with the same reference signs.

DETAILED DESCRIPTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

Figure 1:
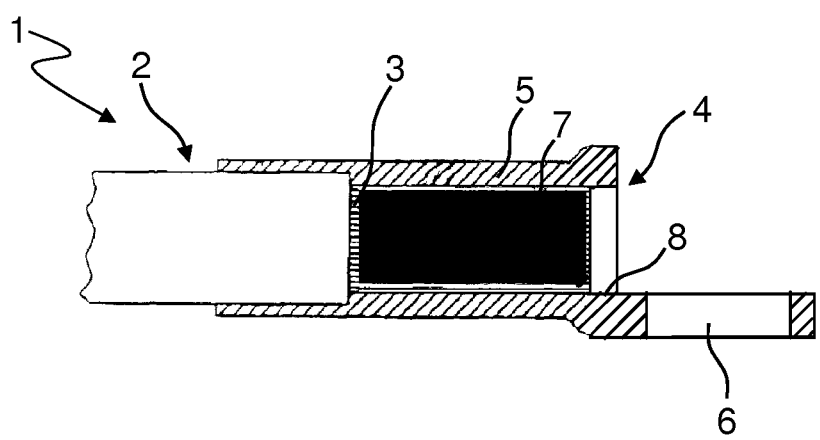
FIG. 1 shows an electrical line arrangement according to the disclosure with a cohesive connection between a line and an electric contact part in a sectional view.

FIG. 1 depicts a sectional view of an electrical line arrangement 1, which has an insulated electrical line 2 with an electrical conductor 3 made of an aluminum material designed as a stranded conductor, and a separate electrical contact part 4 with a receiving sleeve 5 and a connecting part 6 made of a copper material. The line 2 or its conductor 3 is cohesively joined to the contact part 4, so that a cohesive connection 7 exists between these joining partners. At the end face, the receiving sleeve 5 has an opening 8 through which the cohesive connection 7 e.g. is accessible for visual quality inspection. The cohesive connection 7 is formed by adding a powdery metal filler material 9 (see FIGS. 2 to 5)

made from brass, for example. This line arrangement 1 is particularly suitable for lines of larger diameter of approximately 10 to 160 mm$_2$, particularly advantageously for diameters from 35 mm$_2$.

Figure 2:
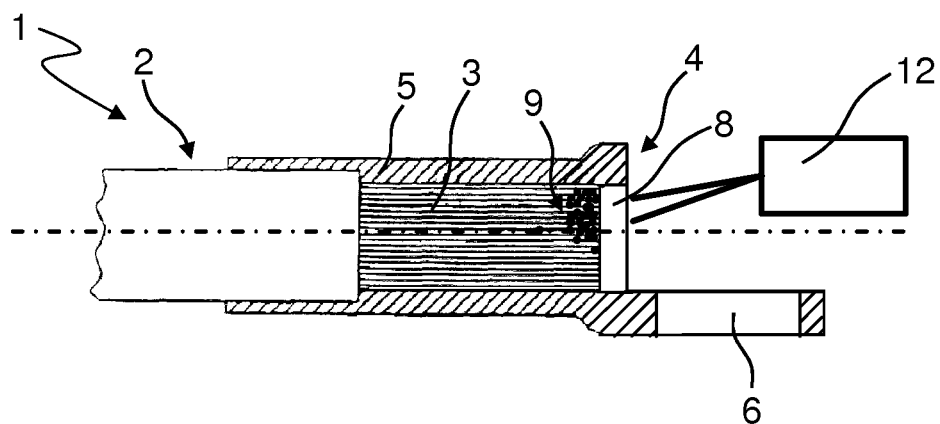
FIG. 2 shows an electrical line arrangement according to the disclosure, wherein a metering device introduces a powdery metal into the line arrangement.
Figure 3:
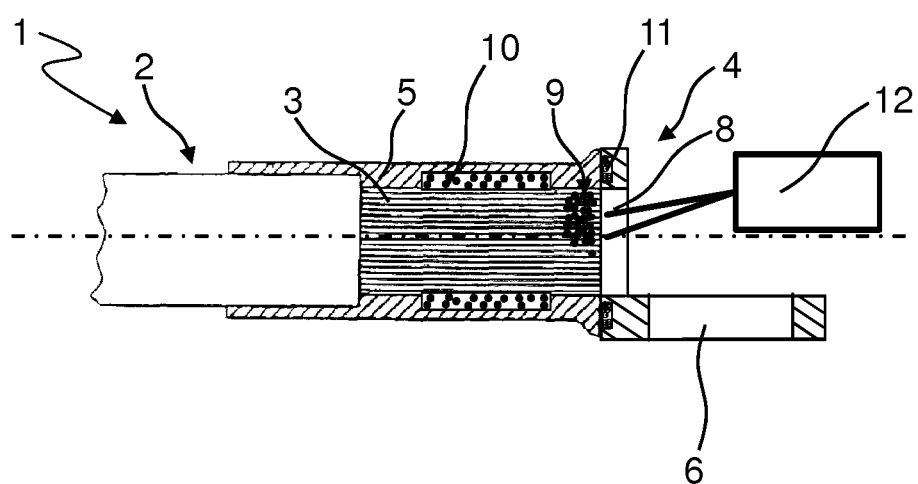
FIG. 3 shows another design example of an electrical line arrangement with the disclosure, in which the contact part is designed in two parts and has an optional solder material depot.

FIGS. 2 and 3 each depict a sectional view of different design examples of the line arrangement 1. These differ in particular in that, in the design example shown in FIG. 2, the contact part 4 is made in one piece and therefore the receiving sleeve 5 and the connecting part 6 are formed in one piece. This is also indicated in FIG. 2 by the common hatching. In the further design example shown in FIG. 3, the contact part 4, however, is made in two parts with a separately formed receiving sleeve 5 and connecting part 6, as indicated by the different hatching.

Furthermore, the design example in FIG. 3 also includes a first one solder material depot 10 and a second solder material depot 11, in which, for example, different solder materials can also be kept. These can be melted by applying heat to the receiving sleeve 5 and can thereby be a form a cohesive solder connection. The second solder material depot 11 is provided in particular in the two-part configuration of the contact part 4 according to the design example shown in FIG. 3, as it can form a material connection between the receiving sleeve 5 and the connection part 6. The respective solder material is provided here in powder form. The respective solder material depots 10, 11 can be formed in the form of a section-wise material application of the solder material on the copper material of the contact part 4, a kind of pocket in which the solder material is introduced, or by similar measures.

In the following, FIGS. 2 to 5 are used to explain how the line arrangement 1 may be produced.

Accordingly, as shown in FIG. 2 or 3, first the line 2 with an exposed conductor 3 and a contact part 4 are provided as separate parts. The conductor 3, exposed by stripping, is accommodated in the receiving sleeve 5 contact part 4 and is enclosed by this on its outer circumference. The receiving sleeve 5 has an opening 8 at the front face, through which a powdery metal filler material 9 made of brass, for example, is fed and thus inserted into the receiving sleeve 5. For this purpose, a roughly schematically indicated, adjustable metering device 12 is used here. The metal filler material 9 is selected as a powder with a grain size, a grain shape and in a quantity that can increase the friction on the conductor 3 and/or the receiving sleeve 5 and also be distributed between the strands of the conductor 3. In addition, volume compensation can take place within the receiving sleeve 5.

Figure 4:
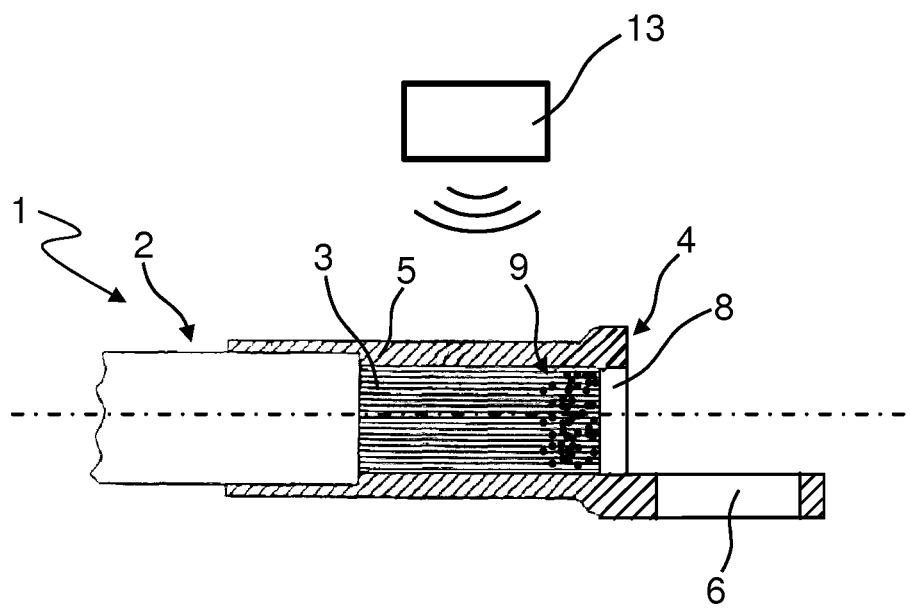
FIG. 4 shows an electrical line arrangement according to the disclosure, in which an ultrasonic device distributes the powdery metal filler material.

FIG. 4 depicts an ultrasound device 13, which is used to distribute the individual particles or grains of the metal filler material 9 inside the receiving sleeve 5. It is at least suggestively recognizable that the metal filler material 9 in FIG. 4 has been distributed over a larger area than in FIG. 2 or 3. In particular, the metal filler material 9 has been distributed over the cross section of the conductor 3, also between its strands.

Figure 5:
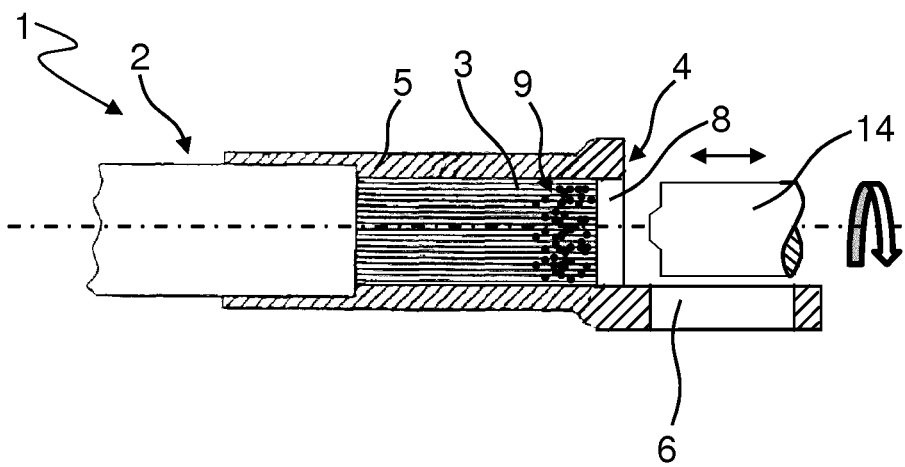
FIG. 5 shows an electrical line arrangement in which a friction welding tool is formed to rotate for forming a cohesive connection between a line and a contact part.

As shown in FIG. 5, a friction welding tool 14, as known from friction stir welding, for example, is then fed through opening 8 to the end face of conductor 3, as indicated by an arrow. In contact with the conductor 3 and possibly also with the receiving sleeve 5, the friction welding tool 14 is then set into a rotational movement relative to the joining partners. The metal filler material 9 increases the friction between the friction welding tool 14 and the joining partners. As a result, at least one of the joining partners, but possibly also both, plasticizes and thus forms the cohesive connection 7 between the joining partners that is, between the conductor 3 and the receiving sleeve 5.

In the case of the further design example according to FIG. 3, the solder material of the respective solder material depot 10, 11 is also melted by the heat input towards the joining partners, which is required for plastification anyway. The solder material of the first solder material depot 10 then supports the cohesive connection 7, for example by providing the welding surface with corrosion protection. The solder material of the second solder material depots 11 then forms a further cohesive connection (not shown here) between the receiving sleeve 5 and the separate connection part 6.

Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

The invention claimed is:

1. A method for integrally joining an electrical line to an electrical contact part, the method comprising the steps:
   inserting an exposed line end of the electrical line into a receiving sleeve of the contact part,
   rotating a friction welding tool on an open-end face of the receiving sleeve for the cohesive connection of the line end with the receiving sleeve,
   wherein
   a powdery metal filler material is introduced into the receiving sleeve before rotation in such a way that the metal filler material is arranged at least partially between at least one of the line end and the receiving sleeve and the friction welding tool, and
   the contact part includes a solder material depot in a heat input zone, from which the solder material is melted due to the rotation of the friction welding tool by at least one of heat input and a residual heat.

2. The method according to claim 1, wherein the metal filler material is introduced into the receiving sleeve by means of an adjustable metering device before the friction welding tool is rotated.

3. That the method according to claim 1, wherein the metal filler material is distributed inside the receiving sleeve after insertion by means of ultrasound.

4. The method according to claim 1, wherein the metal filler material is selected with at least one of a grain size and a grain shape which increases the friction with the friction welding tool.

5. The method according to claim 1, wherein the metal filler material is a mixture of at least one of different grain sizes and grain shapes.

6. The method according to claim 1, wherein the metal filler material is selected or mixed from: brass, bronze, silver or nickel and alloys of brass, bronze, silver or nickel.

7. The method according to claim 1, wherein the contact part is formed in two parts with the receiving sleeve and a connecting part for connection to an electrical counter-connection.

8. The method according to claim 1, wherein a soldering material is additionally introduced for the integrally joining of the receiving sleeve with the connecting part.

9. The method according to claim 7, wherein at least one of the receiving sleeve and the connecting part have a solder material depot which is arranged in such a way that due to the rotation of the friction welding tool by at least one of heat input and a residual heat resulting therefrom, the solder material is released for joining the receiving sleeve and connecting part.

10. The method according to claim 7, wherein the receiving sleeve and the connecting part are pressed together before the line end is inserted.

11. The method according to claim 1, wherein, before rotation, a powdery solder material is introduced into the receiving sleeve such that the solder material is arranged in a heat input zone for melting.

12. The method according to claim 1, wherein the line comprises a conductor of an aluminum material.

13. The method according to claim 1, wherein the line is a stranded conductor and the metal filler material is distributed between strands of the line.

14. The method according to claim 1, wherein the contact part is made of a copper material at least in the region of the receiving sleeve.

15. An electrical line arrangement, comprising at least one electrical line and an electrical contact part which are integrally joined together by inserting an exposed line end of the electrical line into a receiving sleeve of the contact part and rotating a friction welding tool on an open end face of the receiving sleeve for the cohesive connection of the line end with the receiving sleeve, the electrical line arrangement further comprising a powdery metal filler material that is introduced into the receiving sleeve before rotation in such a way that the metal filler material is arranged at least partially between at least one of the line end and the receiving sleeve and the friction welding tool.

* * * * *